United States Patent [19]

Belinkoff

[11] 4,165,681

[45] Aug. 28, 1979

[54] ELECTRICAL WATER HEATER AND DISPENSER

[75] Inventor: Irving R. Belinkoff, Queens Village, N.Y.

[73] Assignee: Kidde Consumer Durables, Corp., Bala Cynwyd, Pa.

[21] Appl. No.: 796,951

[22] Filed: May 16, 1977

[51] Int. Cl.$^2$ ... A47J 31/10; A47J 31/54; F24H/1/00
[52] U.S. Cl. .................................. 99/280; 99/295; 99/306; 219/296; 219/311
[58] Field of Search ................. 99/281, 282, 283, 305, 99/306, 295, 300, 304; 219/296, 311

[56] References Cited

U.S. PATENT DOCUMENTS

| | | | |
|---|---|---|---|
| 3,351,239 | 11/1967 | Flock | 99/305 |
| 3,606,829 | 9/1971 | Alwood | 99/306 |
| 3,878,360 | 4/1975 | Augustine | 99/281 |
| 4,033,248 | 7/1977 | Disalino | 99/281 |

*Primary Examiner*—Robert W. Jenkins
*Attorney, Agent, or Firm*—Seidel, Gonda, Goldhammer & Panitch

[57] ABSTRACT

The electrical water heater and dispenser is designed to heat a small amount of water such as two or three cups of water for use in making hot coffee, hot tea, cocoa, etc. A manually operable valve is provided for dispensing water into at least one receiver adapted to be temporarily positioned therebelow. A heat sink is fixedly secured to substantially the entire body surface of the water tank having a discharge port in its bottom wall. Heater coils are fixedly secured to the heat sink and circumscribe the discharge port.

12 Claims, 5 Drawing Figures

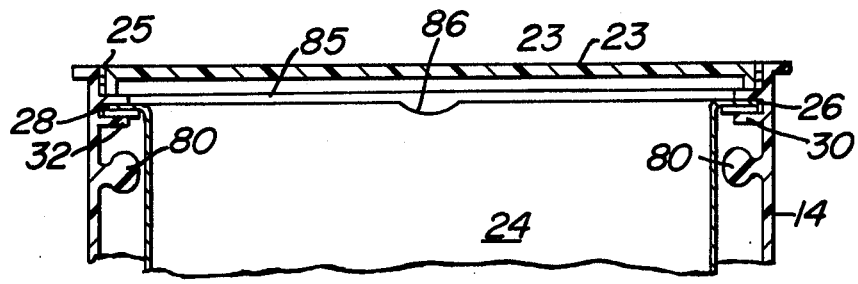
FIG. 3
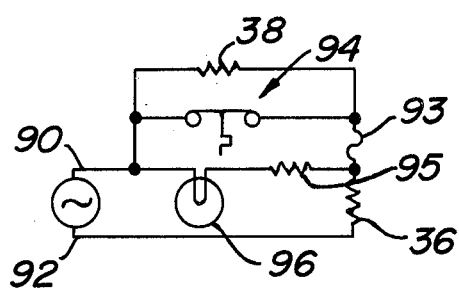
FIG. 4
FIG. 5
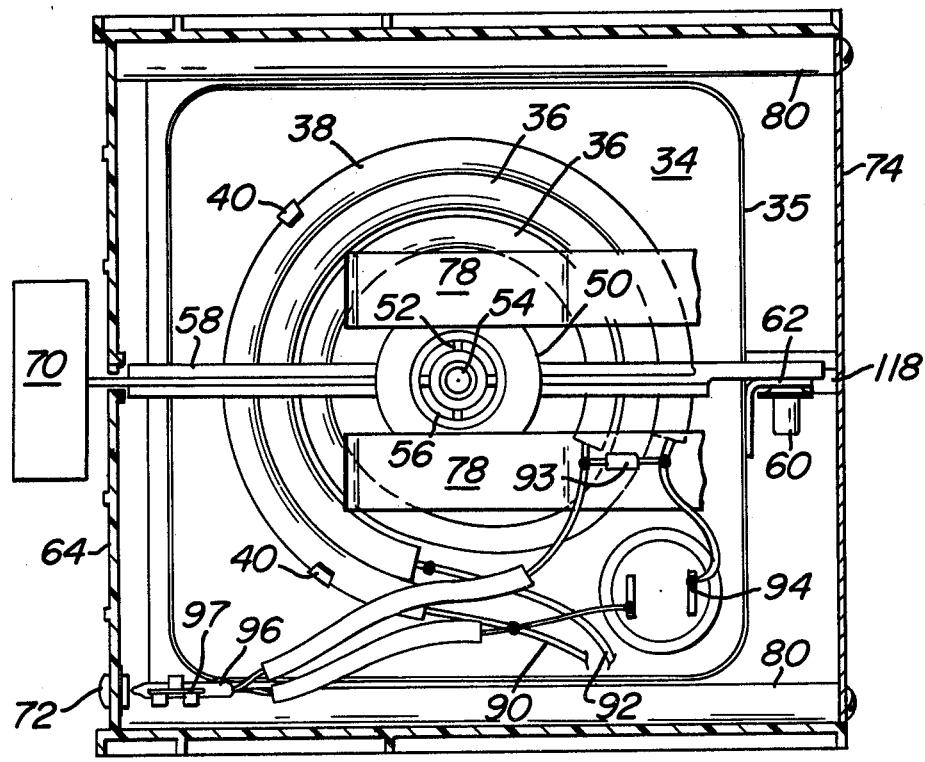

ELECTRICAL WATER HEATER AND DISPENSER

BACKGROUND

There is a need for an electrical water heater and dispenser of the type involved herein which can be made inexpensively and which is adapted to heat and maintain the temperature of small quantities of water such as two cups or three cups of water. The device should be constructed so as to avoid heating more water than is desired, should avoid hot spots, should include means to maintain the water hot after it has been heated, should be properly vented, should allow for manual operation of discharge, etc.

SUMMARY OF THE INVENTION

The electrical water heater and dispenser of the present invention is designed to heat small amounts of water such as two or three cups of water. The apparatus includes a housing having a base and a tank supported at an elevation above the elevation of the base and spaced therefrom so that a portable receiver may be temporarily positioned below the tank to receive hot water therefrom.

The tank has a discharge port in its bottom wall. A heat sink is fixedly secured to substantially the entire bottom of the tank while circumscribing the discharge port. A heater means is fixedly supported on the heat sink for heating water in the tank by conduction and for maintaining the temperature of the water substantially constant when such temperature reaches a predetermined elevated temperature which is below 100° C.

A valve is provided for controlling flow from the discharge port in the tank. A valve actuator, supported by said housing, is provided for manipulating a valve member between open and closed positions. A biasing means is provided for biasing the valve member to a closed position.

In the preferred embodiment of the present invention, the apparatus is comprised of three major components or assemblies. The first component is a one piece housing lacking a rear panel. The second component is the rear panel which is removably secured to the housing. The third component is a preassembled tank assembly which is supported by the housing without the use of any fasteners. As a result of this structural interrelationship, the apparatus can be made inexpensively while at the same time can achieve the objects and advantages set forth above and appearing hereinafter.

For the purpose of illustrating the invention, there is shown in the drawings a form which is presently preferred; it being understood, however, that this invention is not limited to the precise arrangements and instrumentalities shown.

FIG. 3 is a sectional view taken along the line 3—3 in FIG. 2.

FIG. 4 is a schematic wiring diagram.

FIG. 5 is a sectional view taken along the line 5—5 in FIG. 2.

Referring to the drawing in detail, wherein like numerals indicate like elements, there is shown in FIG. 1 apparatus in accordance with the present invention designated generally as 10.

Figure 1:
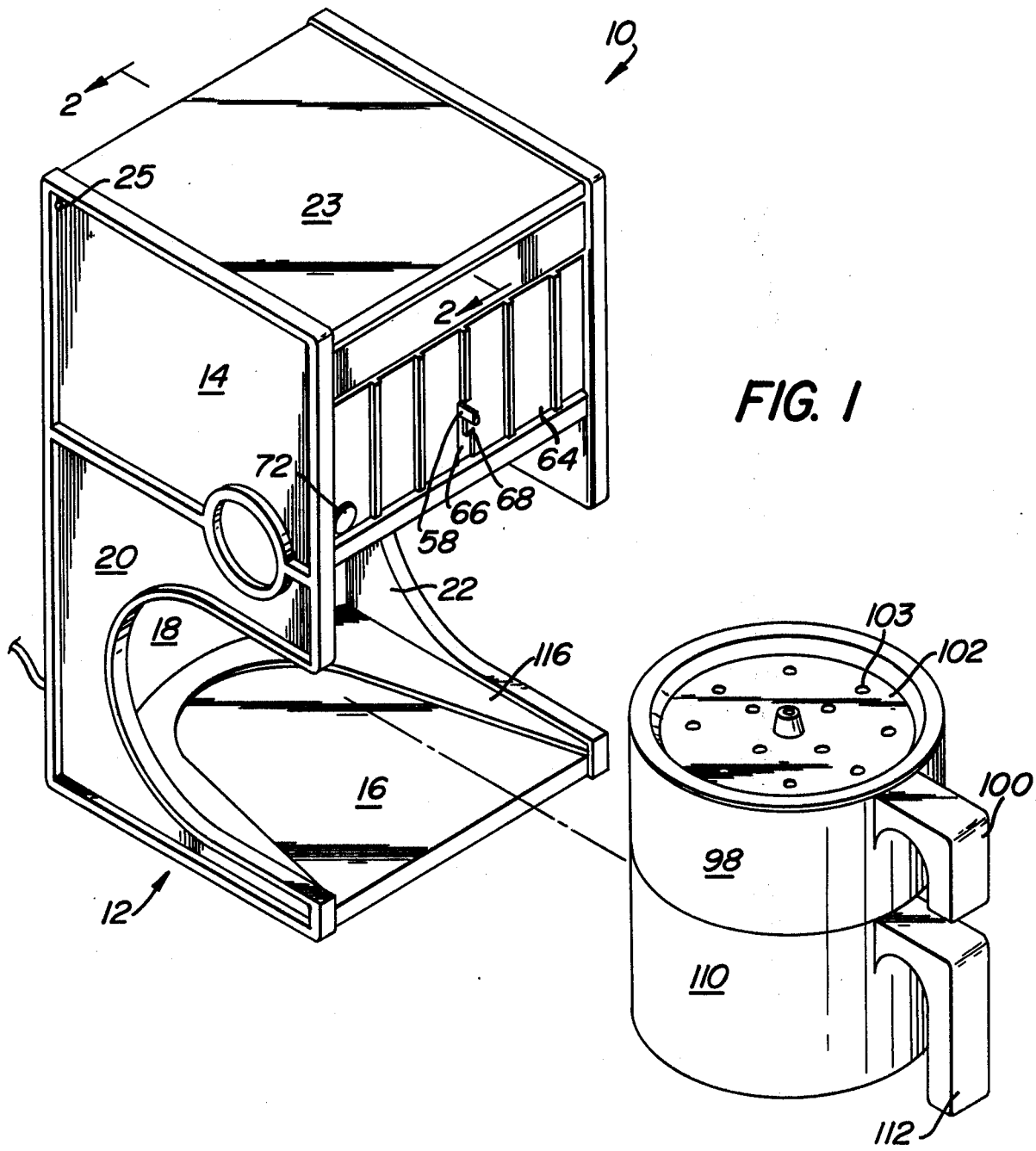
FIG. 1 is an exploded perspective view of apparatus in accordance with the present invention and a receiver adapted to be used therewith.

The apparatus 10 includes a housing 12 having an upper portion 14 disposed above and spaced from a base 16. The upper housing portion 14 is enclosed and supported from the base 16 by innerconnected rear wall 18, side wall 20 and side wall 22. Housing portion 14 has a top wall 23 pivotably secured thereto for pivotal movement about the horizontal axis of aligned pins 25.

Within the housing portion 14, there is provided a tank assembly structurally interrelated in a manner whereby it may be preassembled and inserted into the housing portion 14 for support thereby without the use of any fasteners. The tank assembly includes an open top water tank 24 having a peripheral flange extending around its entire periphery at the upper end thereof. Flanges 26 and 28 on opposite sides of the tank 24 extend into and are supported by tracks 30, 32, respectively on the housing portion 14. See FIG. 3. A track 33 is provided for receiving a flange at the front end of the tank 24 as shown more clearly in FIG. 2. Thus, the tank 24 is supported by two or more peripheral flanges received within tracks on the inner surface of the housing portion 14. The tank assembly is adapted to be inserted into housing portion 14 in a horizontal direction from right to left in FIG. 2 prior to assembling the rear panel as will be made clear hereinafter.

A heat sink 34 is fixedly secured to substantially the entire bottom wall of the tank 24 in any convenient manner such as by brazing. The heat sink 34 has a downwardly extending rim 35 at its periphery so as to prevent dripping water from contacting electrical heater coils 36 and 38.

Referring to FIG. 5, it will be noted that auxiliary heater coil 36 is shown as having two turns while the auxiliary heater coil 38 has only one turn. The heater coils are fixedly secured to the heat sink 34 in any convenient manner. The coils 36, 38 are preferably mechanically secured to the heat sink 34 by tabs 40. The tabs 40 are preferably provided by being struck out from the material of heat sink 34 and then bent so as to overlie the heater coils. It will be noted that each of the heat sink 34 and the coils 36, 38 circumscribe the outlet port 42 which is centrally disposed in the bottom of tank 24.

The tank 24 is preferably made from a non-corrosive material having good heat conductivity such as stainless steel. The inner peripheral surface of tank 24 is preferably provided with indicia to indicate the elevation of water to be inserted therein for one cup, two cup and/or three cups of water. Tank 24 is preferably rectangular in cross section. Suitable dimensions for a tank having a capacity of two cups of water would be a tank whose internal dimensions are approximately 2×3-⅞×3-⅞ inches. Such dimensions would leave an air space of approximately one-half inch high above the level of two cups of water within the tank 24.

A tube 44 is secured to the bottom of tank 24 and surrounds the discharge port 42. A sleeve 46 of resilient material such as rubber is telescoped over the tube 44 with a forcefit. The sleeve 46 is longer than the length of the tube 44 so as to have at its lower end a valve seat. A valve head 48 is provided for cooperation with the valve seat.

Figure 2:
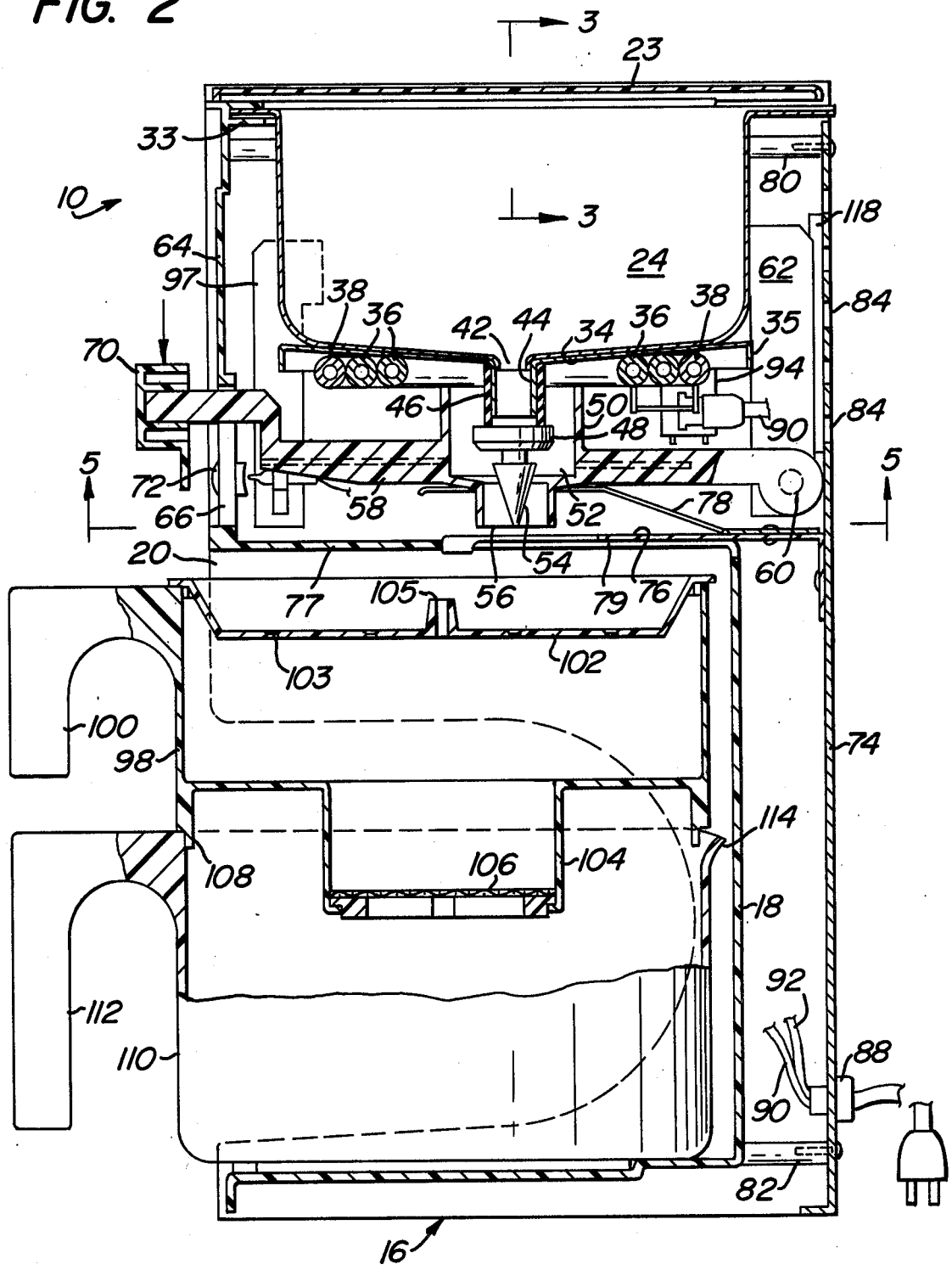
FIG. 2 is a sectional view taken along the line 2—2 in FIG. 1.

The valve head 48 is integral with and connected to a tube 50 by struts 52. The diameter of the tube 50 is substantially greater than the diameter of sleeve 46 as shown in FIG. 2. The valve head 48 has an integral downwardly extending funnel 54 extending to the discharge port 56 from the tube 50. Tube 50 is integral with and supported by a lever arm 58.

The lever arm 58 extends from front to back with respect to the housing portion 14. See FIG. 2. One end of the lever arm 58 is provided with a pivot 60 attached to the bracket 62. Bracket 62 is fixedly secured to the tank 24 and depends downwardly therefrom. The front wall 64 of the housing portion 14 is provided with a vertically disposed slot 66 through which a portion of the lever arm 58 extends. Slot 66 has an offset portion defined by shoulder 68 shown more clearly in FIG. 1. When the lever arm 58 is held by the shoulder 68, there is continuous dispensing from port 56 without the necessity of holding the lever arm 58 in that dispensing position. A button 70 is removably attached to the free end of the lever arm 58 exteriorly of the housing portion 14. It will be noted that button 70 is not shown in FIG. 1 since it would obscure illustration of slot 66 and shoulder 68.

The front wall 64 is provided with a hole closed by a colored lens 72. Lens 72 is preferably colored red, is an indicator, and its purpose will be made clear hereinafter.

A panel 74 is removably secured to the rear face of the housing 12 so as to be spaced from the rear wall 18. See FIG. 2. Bosses 80 are provided on the inner surface of the housing portion 14 adjacent the upper end thereof so that threaded fasteners may secure the upper end of the panel 74 thereto. Similar bosses 82 are provided on the inner surface of the side walls 20 and 22 so that the lower end of the panel 74 may be removably secured thereto by threaded fasteners. See FIGS. 2, 3 and 5.

A bracket 76 is secured to the inner surface of panel 74 and projects inwardly toward the front wall 64 so as to overlie the bottom wall 77 of the housing portion 14. One or more leaf springs 78 are secured to the bracket 76. The leaf springs 78 contact the tube 50 and bias the same as well as valve head 48 upwardly to a closed position. Application of finger pressure to button 70 in a downward direction as indicated by the arrow in FIG. 2 is opposed by the biasing force of springs 78.

The panel 74 is provided with a plurality of vents 84 at an elevation corresponding generally to the elevation of the valve head 48 and extending upwardly to an elevation corresponding to generally the midpoint in the height of the tank 24. The vents 84 enable air to enter the interior of housing portion 14 by convection thereby preventing overheating of the coils 36, 38. The upper edge of the panel 74 is spaced from the upper edge of the side walls of the housing portion 14 so as to define a gap 85. Within the gap 85, the tank 24 has a vent 86 formed by a depression in the rearwardly extending peripheral flange on the tank 24. The gap 85 provides for the escape of heated air and any stream generated within the tank 24.

A grommet 88 is supported by the panel 74. See FIG. 2. Electrical conductors 90 and 92 extend from an AC source through the grommet 88. Conductor 92 is connected to coil 36 which is in series with coil 38 and thermal fuse 93 between the coils. See FIGS. 2 and 4. Coil 38 is connected in parallel with lamp 96 and thermostat 94. Thermostat 94 is fixedly secured to the bottom of the tank 24 and extends through a hole in the heat sink 34. Indicator lamp 96 is provided in series with a high resistance such as a 30 K ohm resistor 95. The lamp 96 is supported by a bracket 97 depending downwardly from and supported by the tank 24. See FIGS. 2 and 5. Bracket 97 positions the lamp 96 opposite and adjacent to the lens 72.

The space between bottom wall 77 on housing portion 14 and base 16 is sufficient to accommodate therebetween one or more receivers. As illustrated, such space accommodates a first receiver 98 having a handle 100. The open top of receiver 98 is closed by a removable cover 102 having a depressed central portion. In the depressed central portion, the cover 102 has a plurality of spaced perforations 103. The outer peripheral rim of the cover 102 overlies the upper end of the receiver 98. The central portion of the cover 102 has a vent 105. Centrally within the receiver 98, there is provided a depending well 104 of substantial height and terminating in a radially inwardly directed flange. A removable filter 106 is supported by said last-mentioned flange.

The first receiver 98 is telescopically and removably coupled to a second receiver 110. Receiver 110 is of the same diameter as receiver 98 and supports the receiver 98 from below. The lower periphery of receiver 98 includes an axially directed flange 108 which enters the upper end of receiver 110 while the upper edge of receiver 110 contacts a shoulder on receiver 98.

The second receiver 110 has a handle 112 and a pouring lip 114 diametrically opposite the handle. As shown in FIG. 2, the well 104 enters the open top of the second receiver 110 and is suspended therein. The base 16 is provided with a converging generally V-shaped ledge 116 so as to guide the receivers when inserted into the space above base 16 and below wall 77.

The apparatus 10 is comprised of three main components. The first main component is the housing 12 which preferably is injection molded of a polymeric plastic material in one piece except for the cover 23 which is pivotably secured to the upper end thereof. The heater assembly is preassembled and is slid into the housing portion 14 from the open back toward the wall 64 along the tracks 28 and 30. Arm 58 is projected through the slot 66 and then the button 70 is attached thereto. Thereafter, the panel 74 is fixedly secured to the housing to complete the assembly of apparatus 10. The thusly-described structural interrelationship renders the device inexpensive due to its ease of assembly and minimum number of parts.

The apparatus 10 is used as follows. The top wall 23 is pivoted upwardly and one, two or three cups of water is introduced into the tank 24. The entire apparatus 10 is sufficiently small and light in weight so that it may be easily carried to a position so that water may be introduced into tank 24 directly from a spigot. In this regard, the entire apparatus 10 is only about 9 inches high and 5 inches wide. Thereafter, the electrical conductors 90, 92 are plugged into an electrical outlet thereby coupling AC current to the main heater coil 36.

When unit is energized (cold), the contacts of bimetal disc thermostat 94 are closed. Power is directed through conductors 90 and 92, thermal cut-off fusible link 93, thermostat 94, and the main heater coil 36. Auxiliary heater coil 38 is bypassed and lamp 96 is bypassed. When correct water temperature in tank 24 is reached such as 185°-195° F., thermostat 94 opens and places the auxiliary heater coil 38, fuse link 93 and main heater coil 36 in series. The lamp 96 lights because resistance of main heater coil 36 is negligible with respect to the 30 K ohm resistor 95, and the overall wattage reduces to approximately that of the auxiliary heater coil 38. The circuit is designed so that the thermal fuse link 93 will open the circuit in the event of an abnormal overheat condition and reduce the power to near zero. This system also permits the lamp 96 to remain on as an indication that power is still in the system and to alert the user the pull the plug.

The user fills the well 104 of the first receiver 98 with coffee grounds, tea leaves, etc. The receivers are then placed in the position as shown in FIG. 2. The button 70 is pushed downwardly against the bias of springs 78 so as to move the valve head 44 away from the juxtaposed end of the rubber sleeve 46. Hot water is now dispensed from the tank 24 through the tube 50 for discharge through port 56 onto the perforated cover 102. Cover 102 causes the water to be distributed over a wide area before flowing through the perforations 103 into the first receiver 98. In this manner, channeling of the water through receiver 98 is avoided.

If it is desired to dispense the entire contents of the tank 24 without physically maintaining finger pressure on button 70, the button 70 and arm 58 are pushed downwardly and then shifted slightly to the right so that arm 58 is caught by shoulder 68. Thereafter, the button 70 may be released and the entire contents of tank 24 will be dispensed into the receivers therebelow.

After all of the desired amount of water has been dispensed into the receiver 98, receiver 108 may be lifted by way of its handle 112 and both receivers moved to a suitable position on a shelf or table. After all of the water has been drained through the grounds in well 104 into the receiver 110, receiver 98 is removed. The beverage may then be consumed from receiver 110 which now acts as a cup or may be poured by way of lip 114 into some other container. The electrical conductors 90, 92 should be unplugged from the electrical outlet as soon as the entire contents of tank 24 has been dispensed. As soon as the temperature of the tank 24 cools below the predetermined range, the thermostat 94 will revert to its original closed position so that the next time the apparatus 10 is used, current will be coupled to the main heating coil 36.

Air enters the upper housing portion 14 by way of the vents 84 and exit by way of the gap 85 due to natural convection. This helps to dry out the interior of the housing portion 14. Any steam generated in tank 24 likewise exits through gap 85. The cone shaped funnel 54 eliminates splashing as water is discharged downwardly onto the cover 102. The heat sink 34 uniformly distributes the heat so as to avoid any heat marks or hot spots. Since the concave vent 86 on the rear flange of the tank 24 extends to the outside, overflow of water will discharge out of the upper housing portion 14 rather than drip down onto the electrical components therewithin.

I have found that the well 104 should have a substantial height so as to extend the percolation time sufficient to develop optimum flavor extraction as the water passes downwardly therethrough. Satisfactory results were obtained when well 104 had a height of about 2.5 centimeters, a diameter of about 3–5 centimeters, and with receiver 98 having a height of about 3–5 centimeters.

Since the bracket 62 is supported by the tank 24, it will be at substantially the same temperature as tank 24. In order to prevent direct conductive contact between bracket 62 and the metal of back panel 74, back panel 74 is provided with a felt pad 118 on its inner surface for contact with bracket 62.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for electrically heating and then dispensing small amounts of water comprising a housing having a base, a tank supported by the housing at an elevation above the base and spaced therefrom so that a portable receiver may be temporarily positioned below the tank to receive hot water therefrom, said tank having a capacity of about two to three cups of water, means on said housing for facilitating introduction of water into said tank, said tank having a discharge port in a bottom wall, a heat sink fixedly secured to substantially the entire bottom wall of the tank and circumscribing said discharge port, a valve supported below said port for controlling flow of water from said port, a valve actuator coupled to said valve for manipulating the valve between open and closed positions, said valve actuator including a tube open at upper and lower ends thereof, said actuator tube circumscribing the tank discharge port, said tube supporting a generally conical funnel coaxial with said discharge port and adjacent the lower end of said tube, means biasing said valve to a closed position, heater coil means fixedly supported on said heat sink for heating water in the tank by conduction and for thereafter maintaining the temperature of water substantially constant when the water temperature is at a predetermined elevated temperature below 100° C., electrical conductors connected to said coil means, and means for venting steam and hot air from within said housing.

2. Apparatus in accordance with claim 1 wherein said valve actuator includes a lever arm pivotably supported by said tank for pivotal movement about a horizontal axis, said valve including a valve head supported by said arm for movement toward and away from a valve seat surrounding the axis of said discharge port.

3. Apparatus in accordance with claim 1 including means on said housing for latching the valve actuator in a dispensing position.

4. Apparatus in accordance with claim 1 wherein said valve and tank are coupled together as a preassembly for introduction into said housing, said housing having tracks on opposite interior surfaces thereof for slideably supporting said tank and valve.

5. Apparatus for heating and dispensing small amounts of water comprising a housing having a base, a tank supported within the housing at an elevation above the base, said tank having an open top and a discharge port in a bottom wall, a heat sink fixedly secured to substantially the entire exposed bottom surface of the tank, said heat sink circumscribing the discharge port, a valve for controlling flow of water from said port including an actuator supported by said tank below the elevation of said port, heater coils fixedly supported on said heat sink for heating water in said tank, said tank having flanges on opposite sides thereof, oppositely disposed inner surfaces on said housing having a track for receiving a flange on said tank so that the tank is suspended within said housing and supported from the housing by said flanges, and means on said housing for facilitating introduction of water into said tank.

6. Apparatus in accordance with claim 5 wherein said housing is provided with an opening adjacent the elevation of the upper edge of said tank for discharge of heated air and/or vapor.

7. Apparatus in accordance with claim 5 wherein said heat sink has a downwardly extending flange at its periphery, and said heater coil means being radially inwardly from said flange on said heat sink.

8. Apparatus for heating and dispensing small amounts of water comprising a housing having a base, a tank supported within the housing at an elevation above the base, said tank having an open top and a discharge port in a bottom wall, a heat sink fixedly secured to substantially the entire exposed bottom surface of the tank, said heat sink circumscribing the discharge port, a valve for controlling flow of water from said port including an actuator supported below the elevation of said port, said actuator including a tube open at both ends and surrounding said valve, said tube being movable in a generally vertical direction by said actuator as the valve is moved between open and closed positions, said tube confining flow of water when the valve is in an open position, heater coils fixedly supported on said heat sink for heating water in said tank, and means on said housing for facilitating introduction of water into said tank.

9. Apparatus in accordance with claim 8 wherein said valve included a valve head supported within said tube radially inwardly of the inner surface of said tube.

10. Apparatus in accordance with claim 8 including a removable container below said tube for spreading and receiving water therefrom, said container having a passage elongated in a vertical direction for containing grounds of a beverage, the height of said passage being sufficient to extend the percolation time sufficient to develop optimum flavor extraction.

11. Apparatus for electrically heating and then dispensing small amounts of water comprising a housing having a base, a tank supported by the housing at an elevation above the base and spaced therefrom so that a portable receiver may be temporarily positioned below the tank to receive hot water therefrom, said tank having a capacity of about two to three cups of water, means on said housing for facilitating introduction of water into said tank, said tank having a discharge port in a bottom wall, a heat sink fixedly secured to substantially the entire bottom wall of the tank and circumscribing said discharge port, a valve supported below said port for controlling flow of water from said port, a valve actuator coupled to said valve for manipulating the valve between open and closed positions, said valve including a sleeve of resilient deformable material circumscribing the axis of said tank discharge port and depending from the bottom wall of said tank, said sleeve forming a valve seat for cooperation with a valve head, said valve head being connected to said valve actuator for movement toward and away from the seat, means biasing said valve to a closed position, heater coil means fixedly supported on said heat sink for heating water in the tank by conduction and for thereafter maintaining the temperature of water substantially constant when the water temperature is at a predetermined elevated temperature below 100° C., electrical conductors connected to said coil means, and means for venting steam and hot air from within said housing.

12. Apparatus for electrically heating and then dispensing small amounts of water comprising a housing having a base, a tank supported by the housing at an elevation above the base and spaced therefrom so that a portable receiver may be temporarily positioned below the tank to receive hot water therefrom, said tank having a capacity of about two to three cups of water, means on said housing for facilitating introduction of water into said tank, said tank having a discharge port in a bottom wall, a heat sink fixedly secured to substantially the entire bottom wall of the tank and circumscribing said discharge port, a valve supported below said port for controlling flow of water from said port, a valve actuator coupled to said valve for manipulating the valve between open and closed positions, means biasing said valve to a closed position, heater coil means fixedly supported on said heat sink for heating water in the tank by conduction and for thereafter maintaining the temperature of water substantially constant when the water temperature is at a predetermined elevated temperature below 100° C., electrical conductors connected to said coil means, and means for venting steam and hot air from within said housing including a back panel removably secured to said housing, said back panel having vents therein below the elevation of the upper edge of said tank, means defining an opening adjacent the upper edge of said tank, said tank having an overflow channel extending through said last-mentioned opening for discharge of water exteriorly of the housing.

* * * * *